Patented Mar. 26, 1946

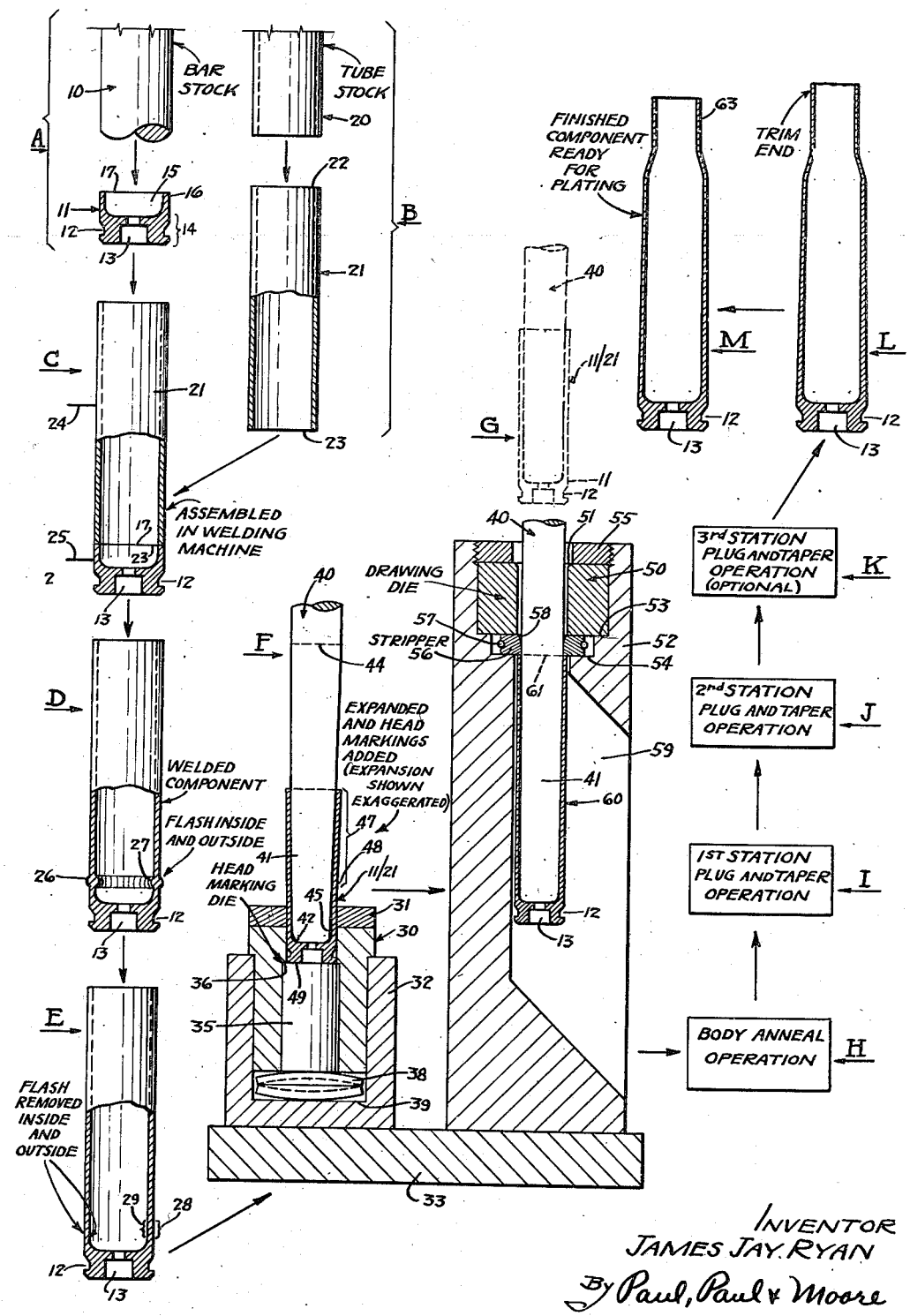

2,397,206

UNITED STATES PATENT OFFICE 2,397,206

WELDED STEEL COMPONENT AND METHOD OF MANUFACTURING SAME

James Jay Ryan, Minneapolis, Minn., assignor to Federal Cartridge Corporation, Minneapolis, Minn., a corporation of Minnesota Application October 15, 1943, Serial No. 506,323

2 Claims. (Cl. 29—1.3)

This invention relates to the manufacture of deep tubular closed-bottom sections of unitary construction capable of withstanding impact gas pressures of many, many thousands of pounds per square inch. The invention is admirably suited for the manufacture of steel shell cases and it is a specific object of the invention to provide a method for the manufacture of such ammunition components and to provide such new and useful steel shell cases.

It is a further object of the invention to provide methods for the fabrication of unitary ammunition components capable of withstanding impact gas pressure loadings of the magnitude developed upon firing of high velocity ammunition.

It is also an object of the invention to provide methods of fabricating ammunition shell cases from bar and tube stock, utilizing a minimum of heavy draw press forming operations, and to provide methods capable of being utilized with equal success for the manufacture of widely varying caliber ammunition shell case.

It is also an object of the invention to provide methods for the manufacture of steel shell cases capable of ready conversion from manufacture of one size to another size with a minimum of retooling.

Other and further objects of the invention are those inherent in the apparatus and method illustrated, described and claimed.

The invention is illustrated with reference to the drawing, which schematically illustrates the steps of manufacturing one type of component, namely a steel ammunition shell case, which is illustrative of the type of component capable of being produced by the invention. The drawing also illustrates various apparatus which are utilized in carrying out the methods of the invention.

For the manufacture of steel shell cases in accordance with the present invention, there is utilized round steel bar-stock 10 which is preferably slightly larger in diameter than the external diameter of the shell case being manufactured. By means of an ordinary screw machine, there is turned out from the bar-stock a cup unit generally designated 11, which, in the instance of the shell case being produced, is turned so as to have an ejector groove 12, an axial cavity 13 for receiving the primer cup and a relatively thick shellhead portion as indicated by the bracket 14. The cup unit is likewise turned so as to have a cavity 15 which leaves an upstanding side wall at 16 of a thickness approximately equal to the side wall of the ultimate shell case undergoing construction. If desired, the machining of the groove 12 and the primer cup openings 13 may be delayed until a subsequent stage in the manufacturing operation, the cup 11 being merely turned with a thick head 14 of the circumferential side wall 16. In another screw machine tube stock generally designated 20, which may either be of the seamless type or flash-welded type, and having side wall thickness equal to the thickest section of the shell case ultimately being produced, is cut off in lengths such as that shown at 21 so as to have true surfaces at 22 and 23. The work flows as indicated by the arrows in the drawing from stage A where the cup pieces 11 are made and stage B where the tubes are cut off to length to a welding machine indicated at stage C, where the lengths of tubes 21 are welded to the cup pieces 11.

In order to accomplish a unification of the cup piece 11 and tube length 21, these parts are welded together by means of the resistance flashwelding technique which may be carried out automatically in rapid succession by a flash-welding machine such as the Taylor-Winfield welding machine type B-8 butt welder model 1233. In this welding technique, the tube stock 21 and the cup stock 11 are gripped and held in alignment and electrical current of high amperage and low voltage is conducted to the parts as indicated by the conductors 24 and 25. By means of the machine the two parts, namely, the tube 21 and the cup 11 are moved axially towards each other until the abutting edges 23 of the tube and 17 of the cup are brought into contact. As this occurs, the very heavy current across the relatively poorly conductive contact area between the parts at surfaces 17 and 23 develops, a large amount of heat, thus heating these surfaces and the adjacent metal to welding temperatures. The time of heating varies in accordance with the sizes of units being welded together, but is usually accomplished in 1 to 10 seconds for small caliber ammunition, depending upon the size during which time the two parts undergoing welding namely the length of tube 21 and the cup 11 are progressed towards each other slightly. As the temperature of the adjacent surfaces 17 and 23 are each molten temperatures, the two parts are squeezed together and an intimate juncture of the metal occurs. The term "resistance flash-welding" is used in the present specification and claims and is intended to mean the technique just described. A specific example of "resistance flash-welding" technique is given in a later portion of the present specification. The resultant welded component is illustrated at D and due to the welding operation there occur inner and outer flashes or excess metal adjacent to the weld, the flashes being indicated at 26 and 27.

By way of further illustration, but without any limitation upon the invention reference is made to the following data:

In the production of 50 cal. steel shell cases of standard dimensions the steel tube portions 21 were used having an outer diameter of .8 inch and inner diameters ranging from .703 to .716". The tubes were 3 inches in length and were of seamless and welded stock. The cup 11 had an overall length of 1/2 inch and a sidewall of 1/4", outer diameter of .804 inch for machining and a cup inner diameter ranging from .699 to .712 inch to allow for outside and inside finish machining. A Taylor-Winfield type B-8 butt welder, automatic cam upset, model 1233; 53 kva.; 220 volts welding machine was used. The secondary voltage was 4 to 5.64 volts. In a typical welding operation the primary voltage was 230; secondary voltage 4.1; primary amperage at the time of upsetting was 102 amperes; secondary amperage at the time of upsetting was 5610 amperes; time of mechanical flash was 3 seconds and the time involved during upsetting was 2 cycles (1/30 sec.). The mechanical flash caused an axial reduction in length of 1/8 inch and upsetting at the end of the flash period covered a reduction of 1/16 inch, the total reduction in axial dimension being 3/16 inch.

The welded component is then finished by means of screw machine operations so as to trim off the flash, leaving a smooth outer and inner surface at area 28 and 29 where the welded joint was made. If desired, the groove 12 and the primer cup 13 may be machined into the welded component at this time, if they were not machined into the cup 11 at stage A.

The component at stage E, after removal of the inside and outside flash, are then sent through two press stages illustrated at F and G, which in the drawing are shown at a somewhat reduced scale as compared to the remaining illustrations. At stage F the welded component 11/21 is fed to the die sleeve generally designated 30, and is held in place by means of plate 31. The die sleeve 30 is itself positioned in a die holder 32 which in turn rests on the press bed 33. Within the die sleeve 30 there is positioned a marking die 35 which is normally spring pressed upwardly against the inner shoulder 36 of the die sleeve by means of a pair of very stiff opposed disk springs 38 which rest upon the inner bottom 39 of the die holder 32. The press is provided with a vertically oscillating expanding punch generally designated 40 which has a maximum diameter at 44, and a tapered end 41 which is smoothly curved off as illustrated at 42. The outer diameter of the punch at the point of maximum diameter of the taper, i. e. level 44, is less than the outer diameter of the shell case ultimately being produced, but larger than the initial internal diameter of the tube stock 20. Stated another way, the diameter of the punch at 44 is equal to the caliber of the shell case less twice the thickness of the shell case wall at its mouth. From the diameter at 44 the taper gradually decreases until at about level 41 it is equal to the initial inner diameter of tube stock 22. A slight clearance is provided at 45 between the inner wall of the component 11/21 and the punch. It may be pointed out that in the drawing the diameter at 44 and the angle of taper are somewhat exaggerated in stage F for purpose of illustration, in order to show clearly the taper of the punch and its effect in expanding the mouth of the tube.

In operation the welded and trimmed component 11/21 are positioned and held in the die sleeve 30 and the punch 40 is brought downward by means of the press mechanism and in so doing enters and expands the upper portion 47 of the component. The taper 41 of the punch 40 is adjusted so that the lowermost part of the flared portion 47 of the component, ends at a fixed distance 48 above the head surface 49 of the shell. Below this level the taper 41 is less than the inner diameter of the tube stock and causes no expansion of the component side wall. Accordingly during the next step in the process, when the side wall is drawn out, the portion of the side wall below level 48 does not undergo any thinning. As the punch 41 reaches the bottom of the component, it forces the shell-head 49 of the component tightly into contact with the marking die 35 which, after producing an intaglio marking on the head 49, is moved downwardly against the heavy pressure developed by springs 38. The springs 38 are selected so as to provide sufficient pressure for forcing the marking die into the head, but the spring yields after the main surface of the marking die has been brought into contact with the head. In this way the punch 40 does not cause any working or thinning of the head portion of the component 11/21.

As the press mechanism continues throughout its cycle of operation, the punch 41 is drawn straight upwardly to a level equal to that shown in dotted lines in stage G and the shell component 11/21 remains firmly on the punch 40, due to the heavy gripping action of the springy steel side wall of the tube against the tapered portion of the punch. It may be explained that as the punch 40 is driven into the component 11/21 at stage F, there may occur a slight shortening of the overall length of the component 11/21 due to the drag of the side wall on the tapered end 41. At stage G there is no exaggeration of the tapered end 41 shown in the drawing.

As the punch 40 is lifted to the position of the dotted lines in stage G, the drawing die generally designated 50 is also shifted sideways until it is in alignment with the punch. The die block 50 is of hardened circular stock, smoothly rounded at 51 so as to guide the shell component head 11 into the die. The die block 50 is held in place by a screw plate 55 in a die support 52 which is in turn fastened to the press bed 33. The die support 52 is provided with a shoulder 53 which serves to support the die block 50 and a lower shoulder 54 which forms a recess below the die block 50 in which a stripper generally designated 56 of usual construction is positioned. The stripper consists of a plurality of segmental blocks which are drawn together by means of a retaining spring 57. When so drawn together the stripper blocks form a collar having a central opening equal approximately to the maximum diameter of the punch 40. The stripper is curved off as illustrated at 58, so as to allow the head end 11 of the shell component to pass through the stripper plate easily as it is driven downwardly through the die block 50. Beneath the stripper 56 the die support 52 is cut away so as to provide a drop-out slot 59 through which the drawn-out shell, illustrated at 60, can fall.

As the punch 40, with the component 11/21 on it, begins to descend, the head end 11 enters the smoothly rounded portion 51 of the die block

50. The minimum internal diameter of the die block is equal to the external diameter, i. e. caliber of the shell component being produced and as the punch 40 has produced no expansion of the tube section of the component below the level 48 at stage F, there is no drawing out of the sidewall metal until this level is reached. If desired there may be just a little draw below level 48 to polish off the metal. Then, as the punch 40, with the component 11/21 upon it, is forced downward through the die block, the metal is thinned out upon the punch, beginning at level 48, and is gradually tapered until it has been drawn out to the length shown in full lines at stage G. The outer diameter of the shell component is the same throughout its length, but the sidewall thickness gradually decreases from a maximum at level 48 and below to a minimum at the mouth 61 of the component. The punch 40 moves downwardly until the mouth 61 of the shell component is below the bottom level of the stripper plate 56, whereupon the springs 57 of the stripper draw the jaws of the stripper into contact with the punch. Then, as the punch is lifted by action of the press, the drawn-out component, generally designated 60, is stripped off the tapered end of the punch and falls out of the slot 59.

The remaining steps H, I, J, K, L and M are analogous to those customarily used during the manufacture of brass shell components. Thus, after leaving the drawing stage G, the thinned-out shell wall, which is hardened due to the work involved in drawing out the metal, is subjected to a body annealing operation during which the upper portion of the shell wall from approximately the level 48 to the mouth 61 of the shell is accurately heated while traveling through a gas or other type of annealing furnace so that this portion of the shell side wall from 48 to 61 is annealed and is suitable for further working. The body annealing operation is illustrated schematically at stage H. The annealed component is then set through two, or optionally three, plug and taper operations illustrated at I, J and optionally K which results finally in the untrimmed shell component shown at L. The untrimmed shell component is then cut off to the prescribed length as indicated at M and is plated or otherwise finished with a rust proof or other coating as desired.

The shell components produced in accordance with the present invention are exceptionally rugged and are completely gas-tight, even to the impact gas pressure developed during the firing of high velocity ammunition. No leakage occurs at the welded joint, and the welded joint is so analogous to the adjacent metal that the weld is not discernible. The ammunition components require no annealing other than the body anneal at stage H, and when finished in accordance with the usual plug and taper technique utilized in the manufacture of brass shell components, the tapered mouth, indicated at 63 (M) and the adjacent side wall have the precise resiliency and flexibility to permit perfect sealing in the rifle chamber, and at the same time the resiliency of the side wall at the mouth is such that the shell side wall retracts from the chamber as the gas pressure has subsided, thus allowing easy ejection. No splitting occurs, even after repeated reloadings or when fired under excessive loadings.

The re-tooling involved for the production of the varying sizes of ammunition is very much less than that involved when retooling for the manufacture of varying sizes of brass or steel ammunition components according to processes heretofore known, because the number of punch press operations involved when manufacturing shell components in accordance with the present invention is only a fraction of the number involved in ordinary brass or steel shell-making techniques. The same screw machines and cut-off machines, used for producing the cup 11 and tube lengths 21, may be used for any size ammunition and within limits, the welding machine used in stage C is capable of handling varying sizes of components. Likewise, the relatively simple dies utilized at stages F and G can be produced at low cost and conveniently. Hence, by utilizing the present invention it is possible to tool for mass production of shells of any selected size in a fraction of the time and at a fraction of the cost, as compared to traditional shell-making techniques.

The invention is obviously adaptible to the production of closed-end vessels of uniform or tapered side wall construction and is not limited to the production solely of ammunition components.

As many apparently widely different embodiments of this invention may be made without departing from the spirit and scope thereof, it is to be understood that I do not limit myself to the specific embodiments herein except as defined by the appended claims.

What I claim is:

1. The steps in the manufacture of cartridge component blanks which comprises machining bar stock to cup-shaped pieces having a cylindrical cup sidewall of thickness equal to the thickest part of the sidewall of the cartridge, cutting off lengths of tube stock, the wall thickness of which is uniform and equals the sidewall thickness of the cup-shaped pieces, welding the length of the tube and the cup together and tapering the wall thickness of a portion of the tube length from a point spaced from the weld to the open end of the tube.

2. The steps in the manufacture of cartridge component blanks which comprises machining bar stock to cup-shaped pieces having a cylindrical cup sidewall of thickness equal to the thickest part of the sidewall of the cartridge, cutting off lengths of tube stock, the wall thickness of which is uniform and equals the sidewall thickness of the cup-shaped pieces, welding the length of the tube and the cup together and tapering the wall thickness of a portion of the tube length from a point spaced from the weld to the open end of the tube by expanding the tube to a gradually increasing diameter in the direction of the open end of the tube and then drawing the tube to a uniform outside diameter while maintaining said gradually increasing inner diameter unchanged.

JAMES JAY RYAN.